(12) United States Patent
Lee

(10) Patent No.: US 10,046,199 B2
(45) Date of Patent: Aug. 14, 2018

(54) MASTICATORY MUSCLE EXERCISE DEVICE

(71) Applicant: HI-FEEL WORLD CO., LTD., Seoul (KR)

(72) Inventor: Sung Wan Lee, Tongyeong-si (KR)

(73) Assignee: HI-FEEL WORLD CO., LTD., Seoul (KR)

(*) Notice: Subject to any disclaimer, the term of this patent is extended or adjusted under 35 U.S.C. 154(b) by 0 days.

(21) Appl. No.: 15/503,550

(22) PCT Filed: Feb. 24, 2016

(86) PCT No.: PCT/KR2016/001797
§ 371 (c)(1),
(2) Date: Feb. 13, 2017

(87) PCT Pub. No.: WO2016/148410
PCT Pub. Date: Sep. 22, 2016

(65) Prior Publication Data
US 2017/0239516 A1    Aug. 24, 2017

(30) Foreign Application Priority Data
Mar. 17, 2015   (KR) ........................ 10-2015-0036577

(51) Int. Cl.
*A63B 23/03*   (2006.01)
*G01V 3/08*   (2006.01)
(52) U.S. Cl.
CPC ........ *A63B 23/032* (2013.01); *A63B 2220/17* (2013.01); *G01V 3/08* (2013.01)

(58) Field of Classification Search
CPC .......... B63B 21/0004; B63B 21/00043; B63B 21/00058; B63B 21/00061;
(Continued)

(56) References Cited

U.S. PATENT DOCUMENTS 1,714,029 A * 5/1929 Kuhn ..................... A61H 13/00
433/216
1,851,865 A * 3/1932 Ptacek ................. A63B 23/032
433/25
(Continued)

FOREIGN PATENT DOCUMENTS

EP           1033148 A2 *  9/2000   .......... A63B 23/032
JP           3193538 U     9/2014
(Continued)

OTHER PUBLICATIONS

International Search Report for corresponding International Application No. PCT/KR2016/001797.

*Primary Examiner* — Gary D Urbiel Goldner
(74) *Attorney, Agent, or Firm* — Egbert Law Offices, PLLC

(57) ABSTRACT

A masticatory muscle exercise device has an upper mouthpiece, a lower mouthpiece and at least one elastic member elastically connecting the upper and lower mouthpieces. A counter is cooperative with the upper and lower mouthpieces so as to sense a number of times that the upper and lower mouthpieces move toward or away from each other. The counter has a magnet mounted on one of the upper and lower mouthpieces and a Hall sensor on the other of the upper and lower mouthpieces.

2 Claims, 7 Drawing Sheets

(58) Field of Classification Search
CPC ........ B63B 21/00065; B63B 21/00072; B63B 21/00076; B63B 21/00178; B63B 21/00181; B63B 21/00185; B63B 21/02; B63B 21/021; B63B 21/022; B63B 21/023; B63B 21/025; B63B 21/026; B63B 21/04; B63B 21/0407; B63B 21/0414; B63B 21/0421; B63B 21/0428; B63B 21/0435; B63B 21/0442; B63B 21/045; B63B 21/0455; B63B 21/05; B63B 21/055; B63B 21/0552; B63B 21/0555; B63B 21/0557; B63B 21/06; B63B 21/065; B63B 21/068; B63B 21/08; B63B 21/15; B63B 21/151; B63B 21/159; B63B 21/4023; B63B 21/4025; B63B 21/4027; B63B 21/4039; B63B 21/4045; B63B 21/4047; B63B 21/4049; B63B 23/025; B63B 23/03; B63B 23/032; B63B 23/18; B63B 23/185; B63B 69/0057; B63B 69/0059; B63B 71/0054; B63B 71/08; B63B 71/085; B63B 2071/0063; B63B 2071/0072; B63B 2071/086; B63B 2209/00; B63B 2209/08; B63B 2220/17; B63B 2220/80; B63B 2220/801; B63B 2220/83; B63B 2220/833; B63B 2225/09; B63B 2225/093; B63B 2225/096

See application file for complete search history.

(56) References Cited

U.S. PATENT DOCUMENTS

| | | | | |
|---|---|---|---|---|
| 4,280,696 A * | 7/1981 | Ramon | ................ | A63B 23/032 482/11 |
| 4,898,535 A * | 2/1990 | Bergersen | ................ | A61C 7/08 433/6 |
| 4,995,404 A * | 2/1991 | Nemir | ................ | A61B 5/224 600/590 |
| 6,203,471 B1 * | 3/2001 | Akihiro | ................ | A63B 23/032 128/859 |
| 6,524,262 B1 * | 2/2003 | Akihiro | ................ | A63B 23/032 482/11 |
| 6,626,664 B1 * | 9/2003 | Bergersen | ................ | A61C 7/08 433/6 |
| 7,476,180 B1 * | 1/2009 | Cobb | ................ | A63B 21/0004 482/11 |
| 2004/0073142 A1 * | 4/2004 | Takeuchi | ................ | A61B 5/0088 600/595 |
| 2008/0003535 A1 | 1/2008 | Williams | | |
| 2009/0105523 A1 * | 4/2009 | Kassayan | ................ | A61C 7/00 600/25 |
| 2011/0030704 A1 | 2/2011 | Hanna | | |
| 2012/0283069 A1 * | 11/2012 | Martin | ................ | A63B 21/023 482/11 |
| 2015/0251051 A1 * | 9/2015 | Mohammed | ........ | A63B 23/032 482/11 |

FOREIGN PATENT DOCUMENTS

| | | |
|---|---|---|
| KR | 101481801 B1 | 1/2015 |
| KR | 101485555 B1 | 1/2015 |
| KR | 101566146 B1 | 11/2015 |

* cited by examiner

MASTICATORY MUSCLE EXERCISE DEVICE

TECHNICAL FIELD

The present invention relates to masticatory muscle exercise device.

BACKGROUND ART

Masticatory muscles, which are used for mastication, are muscles having strong retraction to masticate food and have an end connected to the skull and the other end connected to the chin bone to move the chin bone. There are a total of four pairs of masticatory muscles and they are covered with fasciae for protection.

The masticatory muscles need to be exercised using specific devices, for example, for correcting the temporomandibular joints. Masticatory exercise devices for correcting temporomandibular joints have been disclosed in Korean Patent No. 10-1485555 (registered on 16 Jan. 2015, titled "Adjustable orthopedic dental appliances for temporomandibular joint") and Korean Patent No. 10-1216629 (registered on 20 Dec. 2012, titled "Adjustable orthopedic dental appliances for temporomandibular joint").

However, according to the masticatory muscle exercise devices in the related art, it is not easy for users to actively strengthen masticatory muscles and it is required to solve this problem.

DISCLOSURE

Technical Problem

An object of the present invention is to provide a masticatory muscle exercise device that enables a user to actively strengthen his/her masticatory muscles.

Technical Solution

A masticatory muscle exercise device according to an aspect of the present invention includes: an upper mouthpiece in which upper teeth are fitted; a lower mouthpiece in which lower teeth are fitted; and at least one elastic member connecting the upper mouthpiece and the lower mouthpiece to each other and applying elasticity to the upper mouthpiece and the lower mouthpiece.

Advantageous Effects

According to the masticatory muscle exercise device, the device includes: an upper mouthpiece, a lower mouthpiece, and an elastic member, so a user can strengthen his/her masticatory muscles by actively exercising.

BEST MODE

Hereinafter, masticatory muscle exercise devices according to embodiments are described with reference to the drawings.

Figure 1:
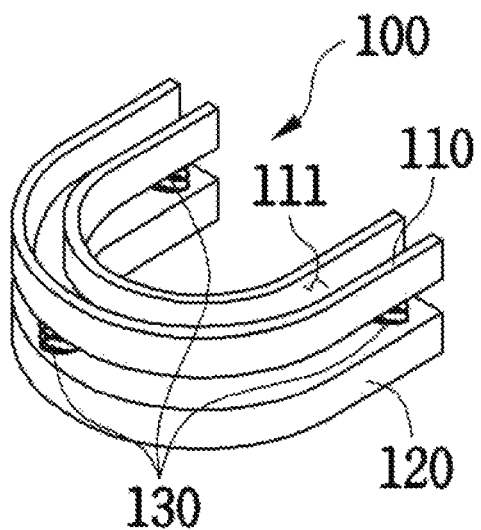
FIG. 1 is a perspective view of a masticatory muscle exercise device according to a first embodiment of the present invention.
Figure 2:
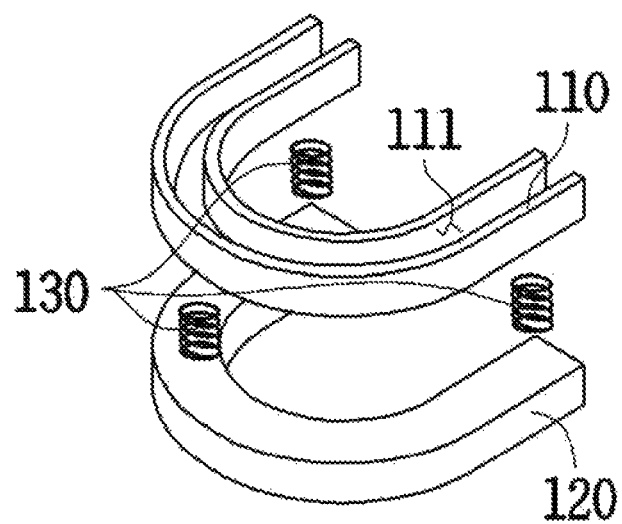
FIG. 2 is an exploded perspective view of the masticatory muscle exercise device according to the first embodiment of the present invention.

FIG. 1 is a perspective view of a masticatory muscle exercise device according to a first embodiment of the present invention and FIG. 2 is an exploded perspective view of the masticatory muscle exercise device according to the first embodiment of the present invention.

Referring to FIGS. 1 and 2, a masticatory muscle exercise device 100 according to an embodiment of the present invention includes an upper mouthpiece 110, a lower mouthpiece 120, and an elastic member 130.

The upper mouthpiece 110, which can be fitted on upper teeth, is formed in a U-shape corresponding to the arrangement of the upper teeth and has a U-shaped upper groove 111 for receiving the upper teeth.

The lower mouthpiece 120, which can be fitted on lower teeth, is formed in a U-shape corresponding to the arrangement of the lower teeth and has a U-shaped bottom groove for receiving the lower teeth.

The elastic member 130 connects the upper mouthpiece 110 and the lower mouthpiece 120 to each other and applies elasticity to the upper mouthpiece 110 and the lower mouthpiece 120.

In this embodiment, the elastic member 130 is formed in the shape of a spring and one or more elastic members are disposed between the upper mouthpiece 110 and the lower mouthpiece 120 and spaced from each other.

For example, three elastic members 130 are provided and arranged at both end portions of the upper mouthpiece 110 and the lower mouthpiece 120 and at the centers of the upper mouthpiece 110 and the lower mouthpiece 120.

According to this configuration, when a user puts the masticatory muscle exercise device 100 in his/her mouth with the upper teeth in the upper mouthpiece 110 and the lower teeth in the lower mouthpiece 120 and then closes the masticatory muscle exercise device 100, the elastic members 130 keep elasticity by compressing. Further, when the user removes the biting force, the masticatory muscle exercise device 100 is returned by the elasticity kept in the elastic members 130 and his/her mouth is opened. The user can actively strengthen the masticatory muscles by repeating this motion.

Although a plurality of, that is, three elastic members 130 are provided in this embodiment, it is just an example and one elastic member may be disposed at any one of both end portions of the upper mouthpiece 110 and the lower mouthpiece 120 or at the centers of the upper mouthpiece 110 and the lower mouthpiece 120.

MODE FOR INVENTION

Masticatory muscle exercise devices according to other embodiments of the present invention are described hereafter with reference to the drawings. In the following description, description of the configuration corresponding to that described in the first embodiment is replaced by it and is not provided.

Figure 3:
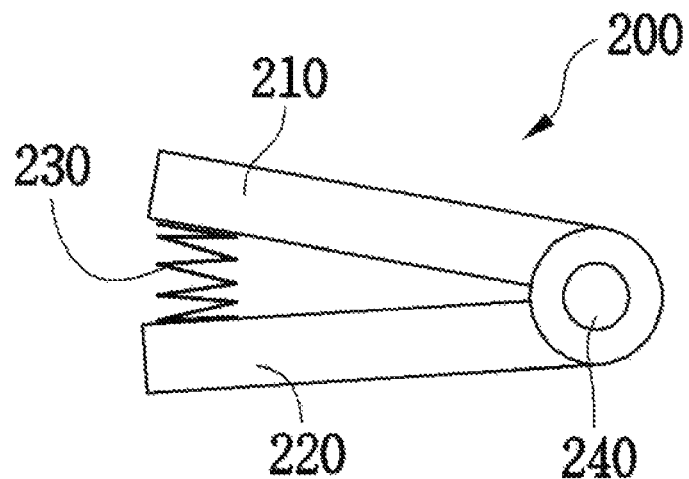
FIG. 3 is a side view of a masticatory muscle exercise device according to a second embodiment of the present invention.

FIG. 3 is a side view of a masticatory muscle exercise device according to a second embodiment of the present invention.

Referring to FIG. 3, in this embodiment, a masticatory muscle exercise device 200 includes a hinge-shaped pivot coupler 240 connecting the rears of an upper mouthpiece 210 and a lower mouthpiece 220 such that they can turn, and an elastic member 230 connects the upper mouthpiece 210 and the lower mouthpiece 220 to each other at the front of the masticatory muscle exercise device 200 spaced from the pivot coupler 240.

According to this configuration, when a user strengthens his/her masticatory muscles with the masticatory muscle exercise device 200, the pivot coupler 240 at the rear turns and the masticatory muscle exercise device 200 closes and opens, and in this process, the elastic member 230 keeps elasticity and return to the initial shape.

Figure 4:
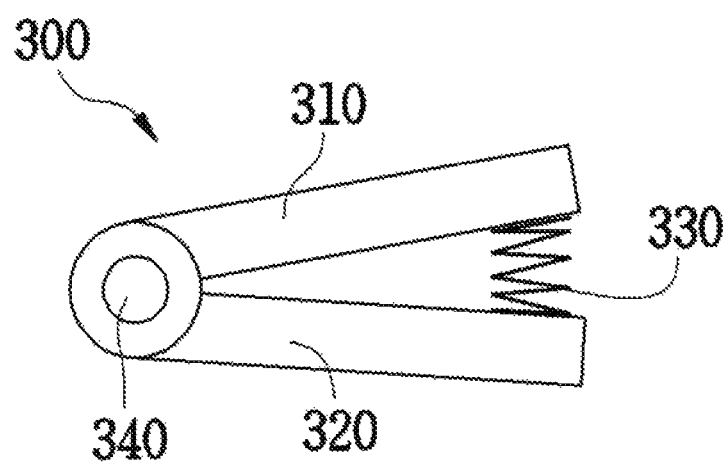
FIG. 4 is a side view of a masticatory muscle exercise device according to a third embodiment of the present invention.

FIG. 4 is a side view of a masticatory muscle exercise device according to a third embodiment of the present invention.

Referring to FIG. 4, in this embodiment, a masticatory muscle exercise the 300 includes a hinge-shaped pivot coupler 340 connecting the fronts of an upper mouthpiece 310 and a lower mouthpiece 320 such that they can turn, and an elastic member 330 connects the upper mouthpiece 310 and the lower mouthpiece 320 to each other at the rear of masticatory muscle exercise device 300 spaced from the pivot coupler 340.

According to this configuration, when a user strengthens his/her masticatory muscles with the masticatory muscle exercise device 300, the pivot coupler 340 at the front turns and the masticatory muscle exercise device 300 closes and opens, and in this process, the elastic member 330 keeps elasticity and return to the initial shape.

Figure 5:
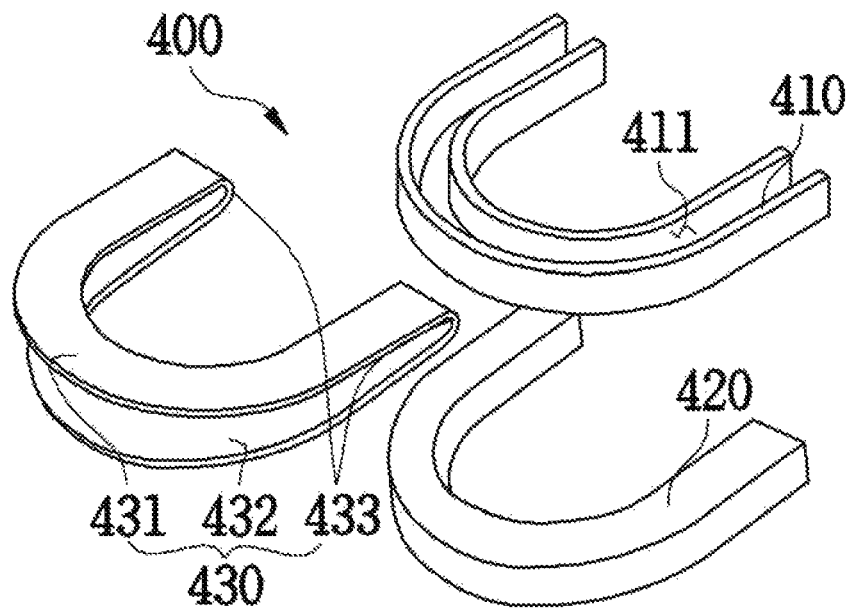
FIG. 5 is an exploded perspective view of a masticatory muscle exercise device according to a fourth embodiment of the present invention.
Figure 6:
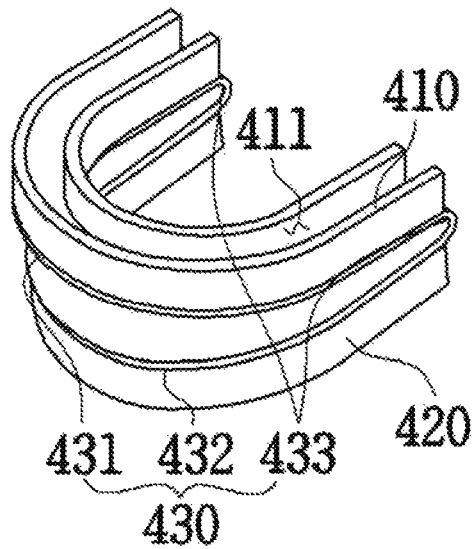
FIG. 6 is a perspective assembly view of the masticatory muscle exercise device according to the fourth embodiment of the present invention.

FIG. 5 is an exploded perspective view of a masticatory muscle exercise device according to a fourth embodiment of the present invention and FIG. 6 is a perspective assembly view of the masticatory muscle exercise device according to the fourth embodiment of the present invention.

Referring to FIGS. 5 and 6, in this embodiment, an elastic member 430, which is formed in the shape of a leaf spring, has an upper support 431 to which an upper mouthpiece 410 is fixed, a lower support 432 to which a lower mouthpiece 420 is fixed, and elastic connecting portions 433 connecting the upper mouthpiece 431 and the lower mouthpiece 432 to each other and applying elasticity.

The upper support 431 and the lower support 432 are formed in a U-shape corresponding to the upper mouthpiece 410 and the lower mouthpiece 420. The upper mouthpiece 410 is seated on the top of the upper support 431 and the lower mouthpiece 420 is seated on the bottom of the lower support 432. Further, the ends of the upper support 431 and the lower support 432 are connected by the curved elastic connecting portions 433. The upper support 431, the lower support 432, and the elastic connecting portions 433 may be formed by making an elliptical plate-shaped ring and then folding the ring.

Figure 7:
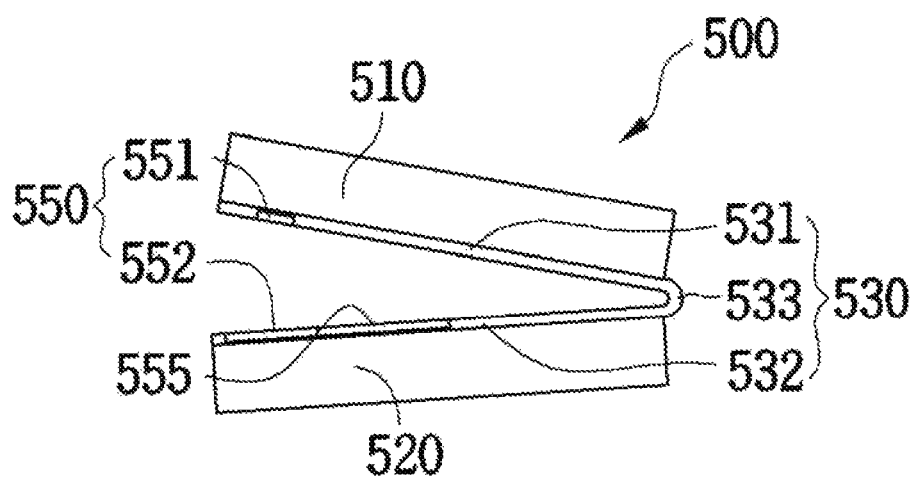
FIG. 7 is a side view of a masticatory muscle exercise device according to a fifth embodiment of the present invention.

FIG. 7 is a side view of a masticatory muscle exercise device according to a fifth embodiment of the present invention.

Referring to FIG. 7, in this embodiment, a masticatory muscle exercise device. 500 further includes a counter 550 that can sense the number of times that an upper mouthpiece 510 and a lower mouthpiece 520 move close to and away from each other.

The counter 550 includes a magnet 551 mounted on any one of the upper mouthpiece 510 and the lower mouthpiece 520 and a hall sensor 552 mounted on the other one without the magnet 551 of the upper mouthpiece 510 and the lower mouthpiece 520 to sense a change in magnetic force due to the magnet 551 moving close to or away from the hall sensor.

For example, the magnet 551 may be mounted on the upper mouthpiece 510 and the hall sensor 552 may be mounted on the lower mouthpiece 520.

Reference numeral '555' is a battery that can supply power to the hall sensor 552, but is selectively provided, and power may be supplied through a cable instead of the battery 555.

According to this configuration, the number of times that the upper mouthpiece 510 and the lower mouthpiece 520 move close to and away from each other by a user repeatedly biting and releasing the masticatory muscle exercise device 500 in his/her mouth can be sensed by the hall sensor 552 and displayed on a specific control unit (not shown) or a specific display unit (not shown).

Figure 8:
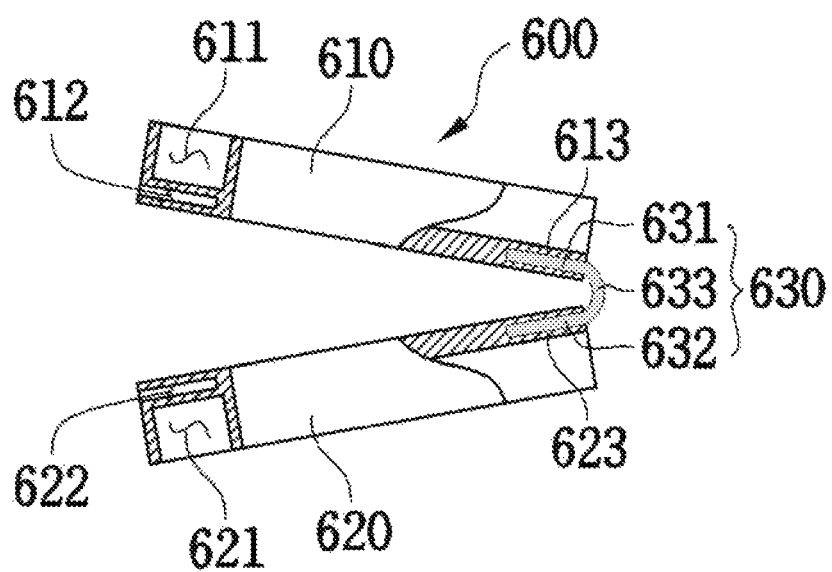
FIG. 8 is a side view of a masticatory muscle exercise device with an elastic member coupled to the rear in accordance with a sixth embodiment of the present invention.
Figure 9:
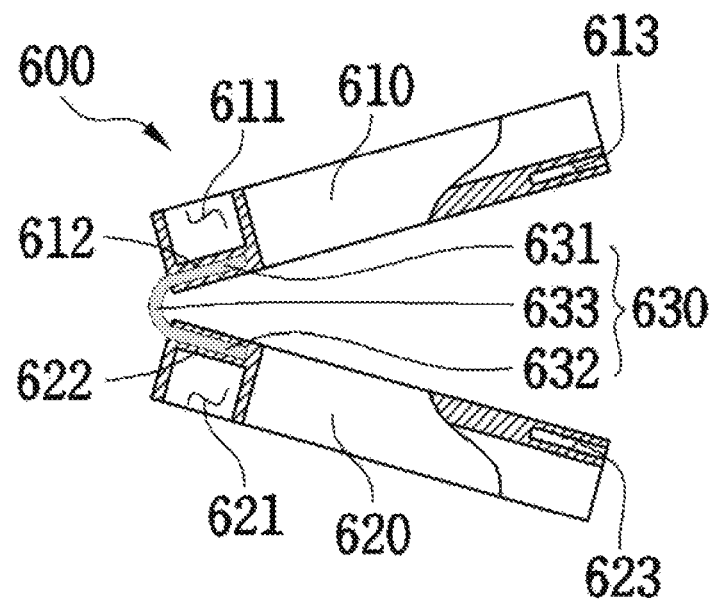
FIG. 9 is a side view of the masticatory muscle exercise device according to the sixth embodiment of the present invention with an elastic member coupled to the front of the device.

FIG. 8 is a side view of a masticatory muscle exercise device with an elastic member coupled to the rear in accordance with a sixth embodiment of the present invention and FIG. 9 is a side view of the masticatory muscle exercise device according to the sixth embodiment of the present invention with an elastic member coupled to the front of the device.

Referring to FIGS. 8 and 9, in this embodiment, an elastic member 630, which is formed in the shape of a leaf spring, has an upper support 631 coupled to an upper mouthpiece 610, a lower support 632 coupled to a lower mouthpiece 620, and an elastic connecting portion 633 connecting the upper mouthpiece 631 and the lower mouthpiece 632 to each other and apply elasticity to the mouthpieces.

Further, upper support holes 612 and 613 in which the upper support 631 can be inserted are formed at the upper mouthpiece 61 and lower support holes 622 and 623 in which the lower support 632 can be inserted are formed at the lower mouthpiece 620.

One of the upper support holes 612 and 613 is formed at the front that is the center of the upper mouthpiece 610 and the other one is formed at the rear, that is, the rear ends of the upper mouthpiece 610.

One of the lower support holes 622 and 623 is formed at the front that is the center of the lower mouthpiece 620 and the other one is formed at the rear, that is, the rear ends of the lower mouthpiece 620.

As described above, since the upper support holes 612 and 613 and the lower support holes 622 and 623 are formed respectively at the fronts and rears of the upper mouthpiece 610 and the lower mouthpiece 620, the elastic member 630 connects the upper mouthpiece 610 and the lower mouthpiece 620 at the fronts or the rears of the mouthpieces 610 and 620 and applies elasticity to the mouthpieces.

The upper support 631 and the lower support 632 can be separably inserted respectively in the upper support holes 612 and 613 and the lower support holes 622 and 623.

As shown in FIG. 9, in order to connect the fronts of the upper mouthpiece 610 and the lower mouthpiece 620 with the elastic member 630, the upper support 631 and the lower support 632 are inserted respectively into the upper support hole 612 and the lower support hole 622 at the fronts of the upper mouthpiece 610 and the lower mouthpiece 20.

On the other hand, as shown in FIG. 8, in order to connect the rears of the upper mouthpiece 610 and the lower mouthpiece 620 with the elastic member 630, the upper support 631 and the lower support 632 are inserted respectively into the upper support hole 613 and the lower support hole 623 at the rears of the upper mouthpiece 610 and the lower mouthpiece 620.

According to this configuration, as required, it is possible to selectively connect the fronts and the rears of the upper mouthpiece 610 and the lower mouthpiece 620 with the elastic member 630.

Figure 10:
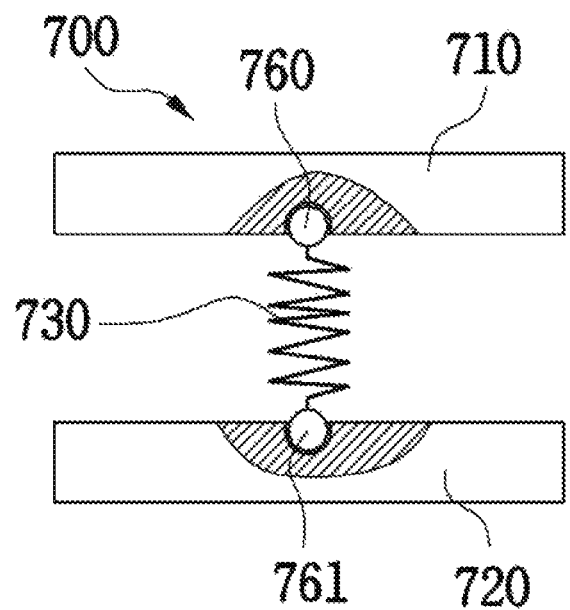
FIG. 10 is a side view of a masticatory muscle exercise device with an elastic member coupled to the rear in accordance with a seventh embodiment of the present invention.
Figure 11:
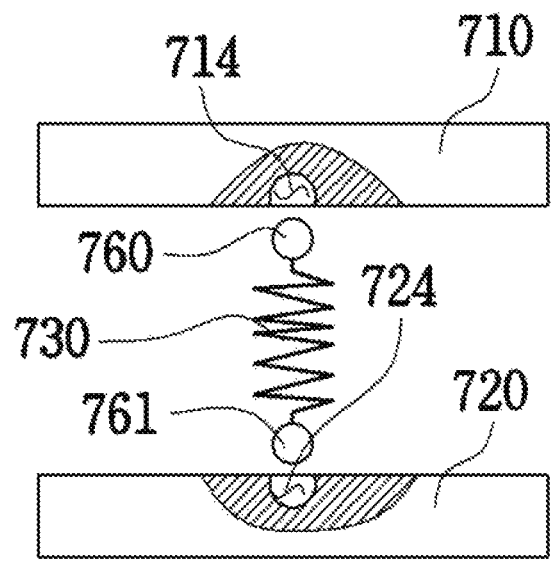
FIG. 11 is a side view of the masticatory muscle exercise device according to the seventh embodiment of the present invention with an elastic member separated.

FIG. 10 is a side view of a masticatory muscle exercise device with an elastic member coupled to the rear in accordance with a seventh embodiment of the present invention and FIG. 11 is a side view of the masticatory muscle exercise device according to the seventh embodiment of the present invention with an elastic member separated.

Referring to FIGS. 10 and 11, in this embodiment, an elastic member 730 is separably connected to at least one of an upper mouthpiece 710 and a lower mouthpiece 720.

In detail, elastic member-coupling holes 714 and 724 are formed respectively on the bottom of the upper mouthpiece 710 and the top of the lower mouthpiece 720, and elastic member couplers 760 and 761 are disposed respectively at the upper end a lower end of the elastic member 730 and separably fitted in the elastic member-coupling holes 714 and 724, respectively, whereby the elastic member 730 is separably coupled to the upper mouthpiece 710 and the lower mouthpiece 720.

For example, the elastic member couplers 760 and 761 are formed in the shape of a sphere and the elastic member-coupling holes 714 and 724 are formed in the shape of a hemisphere, whereby the elastic member couplers 760 and 761 can be separably fitted in the elastic member-coupling holes 714 and 724.

As described above, since the elastic member 730 is separably coupled to the upper mouthpiece 710 and the lower mouthpiece 720, it is possible to simply separate the elastic member 730, the upper mouthpiece 710, and the lower mouthpiece 720 for washing, and then combine them.

Figure 12:
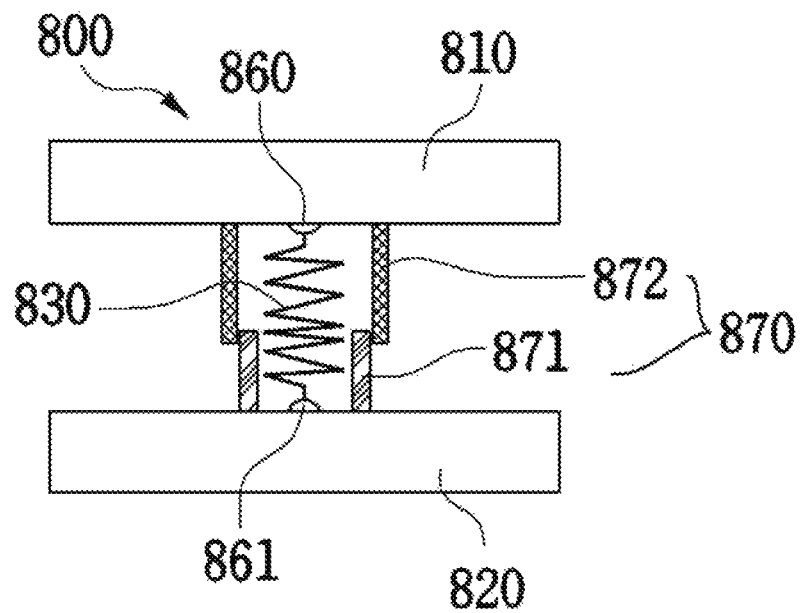
FIG. 12 is a side view of a masticatory muscle exercise device with an elastic member coupled to the rear in accordance with an eighth embodiment of the present invention.

FIG. 12 is a side view of a masticatory muscle exercise device with an elastic member coupled to the rear in accordance with an eighth embodiment of the present invention.

Referring to FIG. 12, in this embodiment, a vertical guide unit 870 that guides an upper mouthpiece 810 and a lower mouthpiece 820 that vertically move when an elastic member 830 contracts and expands is further provided.

In detail, the vertical guide unit 870 is composed of an upper vertical guide 872 that is a hollow cylinder extending down from the bottom of the upper mouthpiece 810 and a lower vertical guide 871 that is a hollow cylinder extending up from the top of a lower mouthpiece 820.

The lower vertical guide 871 vertically moves inside the upper vertical guide 872. Obviously, it is just an example and the upper vertical guide 872 may vertically move inside the lower vertical guide 871.

The elastic member 871 is disposed inside the lower vertical guide 871 and the upper vertical guide 872.

According to this configuration, when the upper mouthpiece 810 and the lower mouthpiece 820 are moved close to and away from each other by external force, the upper mouthpiece 810 and the lower mouthpiece 820 vertically moving are guided by the vertical guide unit 870, so they can stably vertically move.

Obviously, the elastic member 830 is separably coupled to the upper mouthpiece 810 and the lower mouthpiece 820.

Figure 13:
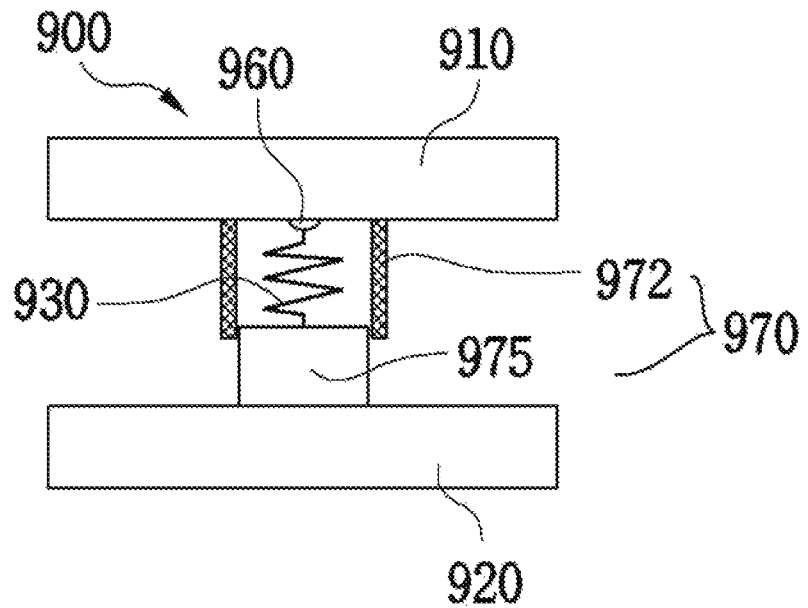
FIG. 13 is a side view of a masticatory muscle exercise device with an elastic member coupled to the rear in accordance with a ninth embodiment of the present invention.

FIG. 13 is a side view of a masticatory muscle exercise device with an elastic member coupled to the rear in accordance with a ninth embodiment of the present invention.

Referring to FIG. 13, in this embodiment, a vertical guide unit 970 is composed of an upper vertical guide 972 extending down from the bottom of an upper mouthpiece 910 and a lower vertical guide 975 extending up from the top of a lower mouthpiece 920, in which the upper vertical guide 972 is a hollow cylinder and the lower vertical guide 975 is a solid rod and can vertically move inside the upper vertical guide 972.

The upper end of an elastic member 930 is separably coupled to the bottom of the upper mouthpiece 910 and the lower end of the elastic member 930 is separably coupled to the top of the lower vertical guide 975.

Figure 14:
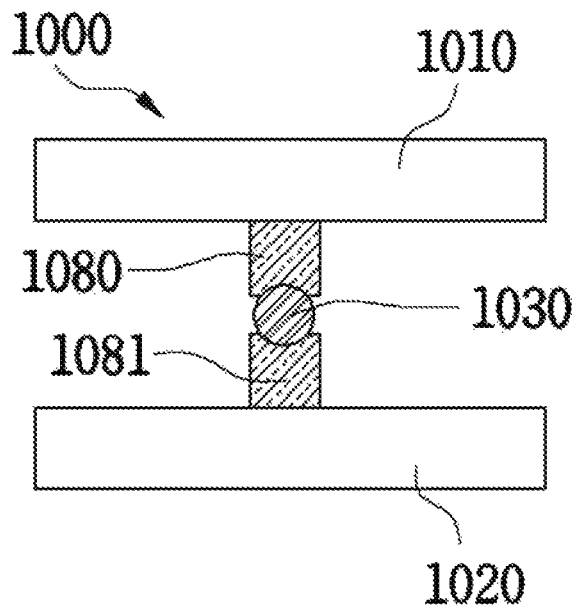
FIG. 14 is a side view of a masticatory muscle exercise device with an elastic member coupled to the rear in accordance with a tenth embodiment of the present invention.

FIG. 14 is a side view of a masticatory muscle, exercise device with an elastic member coupled to the rear in accordance with a tenth embodiment of the present invention.

Referring to FIG. 14, in this embodiment, an elastic member 1030, which is made of rubber rather than a metal, for example a spring, is disposed to apply elasticity between an upper mouthpiece 1010 and a lower mouthpiece 1020.

An upper protrusion 1080 and a lower protrusion 1081 that have a predetermined length are formed on the bottom of the upper mouth 1010 and the top of the lower mouthpiece 1020 and the elastic member 1030 may be disposed between the free ends of the upper protrusion 1080 and the lower protrusion 1081.

Although the present invention, was described with reference to specific embodiments in the above, the present invention may be changed and modified in various ways by those skilled in the art without departing from the spirit and scope of the present invention described in claims. However, it should be understood that the changes and modifications are all included in the scope of the present invention.

INDUSTRIAL APPLICABILITY

According to the masticatory muscle exercise device according to an embodiment of the present invention, a user can strengthen his/her masticatory muscles by actively exercising, so the device can be considered as having high industrial applicability.

The invention claimed is:

1. A masticatory muscle exercise device comprising:
   an upper mouthpiece adapted to fit to upper teeth of a person;
   a lower mouthpiece adapted to fit to lower teeth of the person;
   at least one elastic member connecting said upper mouthpiece and said lower mouthpiece to each other to provide elasticity between said upper mouthpiece and said lower mouthpiece; and
   a counter that senses a number of times that said upper mouthpiece and said lower mouthpiece move toward and away from each other, said counter comprising:
   a magnet mounted on one of said upper mouthpiece and said lower mouthpiece; and
   a Hall sensor mounted on the other of said upper mouthpiece and said lower mouthpiece, said Hall sensor sensing a change in magnetic force as a result of said magnet moving toward or away from said Hall sensor as said upper mouthpiece and said lower mouthpiece move toward or away from each other.

2. The masticatory muscle exercise device of claim 1, wherein the at least one elastic member is a leaf spring, said leaf spring comprising: an upper support affixed to said upper mouthpiece; a lower support affixed to said lower mouthpiece; and an elastic connecting portion connected to said upper support and said lower support to provide the elasticity between said upper mouthpiece and said lower mouthpiece.

* * * * *